United States Patent
Miyazaki

(10) Patent No.: US 6,824,201 B2
(45) Date of Patent: Nov. 30, 2004

(54) PILLAR TRIM STRUCTURE

(75) Inventor: Masahide Miyazaki, Nagoya (JP)

(73) Assignee: Mitsubishi Jidosha Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/620,355

(22) Filed: Jul. 17, 2003

(65) Prior Publication Data

US 2004/0056514 A1 Mar. 25, 2004

(30) Foreign Application Priority Data

Jul. 19, 2002 (JP) ........................................ 2002-211564

(51) Int. Cl.$^7$ ........................... B60R 13/00; B60R 21/12
(52) U.S. Cl. ............................ 296/193.06; 296/193.03; 296/1.08; 52/716.7
(58) Field of Search ................... 296/193.03, 193.05, 296/193.06, 203.03, 1.08; 52/716.6, 716.7, 718.04, 718.06

(56) References Cited

U.S. PATENT DOCUMENTS

| | | | | | |
|---|---|---|---|---|---|
| 2,267,511 A | * | 12/1941 | Uum | ........................... | 24/296 |
| 2,275,119 A | * | 3/1942 | Wiley | ........................... | 24/293 |
| 2,607,093 A | * | 8/1952 | West | ........................... | 24/293 |
| 3,074,134 A | * | 1/1963 | Buechler | ........................... | 24/289 |
| 4,388,355 A | * | 6/1983 | Ikemizu | ........................... | 428/31 |
| 5,186,509 A | * | 2/1993 | Tyves | ........................... | 52/716.5 |
| 6,095,594 A | * | 8/2000 | Riddle et al. | ........................... | 296/191 |
| 6,142,506 A | * | 11/2000 | Patel et al. | ........................... | 280/728.2 |
| 6,145,908 A | * | 11/2000 | Deb et al. | ........................... | 296/39.1 |
| 6,179,359 B1 | * | 1/2001 | Clauson et al. | ........................... | 296/39.1 |
| 2001/0052210 A1 | * | 12/2001 | Mizutani et al. | ........................... | 52/208 |

FOREIGN PATENT DOCUMENTS

| | | |
|---|---|---|
| JP | 2001-168482 A | 6/2000 |
| JP | 2001-310699 A | 11/2001 |

* cited by examiner

*Primary Examiner*—Patricia L. Engle
(74) *Attorney, Agent, or Firm*—Birch, Stewart, Kolasch & Birch, LLP

(57) ABSTRACT

A pillar trim structure comprises: a vehicular pillar; a pillar trim for covering the pillar from the inner side of a compartment; a first retained member having its one end fixed on a vehicular widthwise face of the pillar trim and extended to the side of the pillar and its other end retained in a first hole formed in the pillar; and a second retained member having its one end fixed on the vehicular widthwise face of the pillar trim and extended to the side of the pillar and its other end retained in a second hole formed in the pillar. The engagements between the first and the second retained members, and the pillar can be released by deforming the pillar trim to separate the other end of the first retained member and the other end of the second retained member.

21 Claims, 4 Drawing Sheets

PILLAR TRIM STRUCTURE

The entire disclosure of Japanese Patent Application No. P2002-211564 filed on Jul. 19, 2002 including specification, claims, drawings, and summary is incorporated herein by reference in its entirety.

BACKGROUND OF THE INVENTION

1. Field of the Invention

The present invention relates to a pillar trim structure for fixing a pillar trim on a pillar.

2. Description of the Related Art

A pillar trim made of a resin, for example, is usually mounted as an interior part to cover a pillar of a vehicle. The pillar trim is intended to improve appearance of an interior of the vehicle and to improve protection of a passenger when the passenger comes into contact with the pillar.

Here, an ordinary method of prior art is to mount the pillar trim on the pillar by means of screws. However, this method not only involves the cost for the screws but also takes the step of fastening the screws. Thus, in recent years, there has been developed and practiced a structure, in which the pillar trim can be simply mounted by providing it with a clip and by retaining the clip in the holes of the pillar.

Recently, on the other hand, there has been developed a vehicle equipped with a curtain type airbag housed in a roof side portion for protecting the head of the passenger. In the vehicle equipped with such an airbag, a device has been made to prevent the pillar trim from easily falling off when the airbag is deployed.

JP-A-2000-168482, for example, discloses a construction, in which the pillar trim is provided with clips and engagement holes whereas a roof side member is provided with engagement projections so that the engagement holes may engage with the engagement projections, even when the airbag is deployed to push the pillar trim into the compartment, to prevent the pillar trim from falling off.

JP-A-2001-310699, on the other hand, discloses a construction, in which the pillar trim is provided with clips and retained pawls so that the pillar trim may be prevented, even when the airbag is deployed to push the pillar trim into the compartment, from falling off by the pawls retained on the pillar.

However, the construction disclosed in JP-A-2000-168482 has problems that the cost is raised because it is necessary to enhance the rigidity and strength of the engagement projections, and that the engagement projections come, while the vehicle is running, into contact with the peripheral edges of the engagement holes thereby to causes noises.

On the other hand, the construction disclosed in JP-A-2001-310699 can prevent the pillar trim sufficiently from falling off once the retained pawls are retained by the pillar, but has a problem that the pillar trim may be difficult to demount, when mistaken equipments are attached or when recycling the vehicle after being scrapped.

SUMMARY OF THE INVENTION

The present invention has been conceived to solve those problems and has an object to provide a pillar trim structure, which can be easily mounted/demounted with a simple construction while being prevented from falling off.

In order to achieve the above-specified object, according to the present invention, there is provided a pillar trim structure, which comprises: a first retained member having its one end fixed on the vehicular widthwise face of the pillar trim and extended to the side of the pillar and its other end retained in a first hole formed in the pillar; and a second retained member having its one end fixed on the vehicular widthwise face of the pillar trim and extended to the side of the pillar and its other end retained in a second hole formed in the pillar. In the pillar trim structure, the engagements between the first retained member and the second retained member, and the pillar can be released by deforming the pillar trim to separate the other end of the first retained member and the other end of the second retained member from each other.

Therefore, the pillar trim is stably fixed on the pillar side by the first retained member and the second retained member so that the pillar trim can be prevented from easily falling off. By deforming the pillar trim to separate the other end of the first retained member and the other end of the second retained member from each other, moreover, the retentions between the first retained member and the second retained member, and the pillar can be released to demount the pillar trim reliably and easily from the pillar, if desired so.

BRIEF DESCRIPTION OF THE DRAWINGS

The present invention will become more fully understood from the detailed description given herein below and the accompanying drawings which are given by way of illustration only, and thus are not limitative of the present invention, and wherein.

DESCRIPTION OF THE PREFERRED EMBODIMENTS

A first embodiment of a vehicular pillar trim structure according to the present invention will be described with reference to the accompanying drawings.

Figure 1:
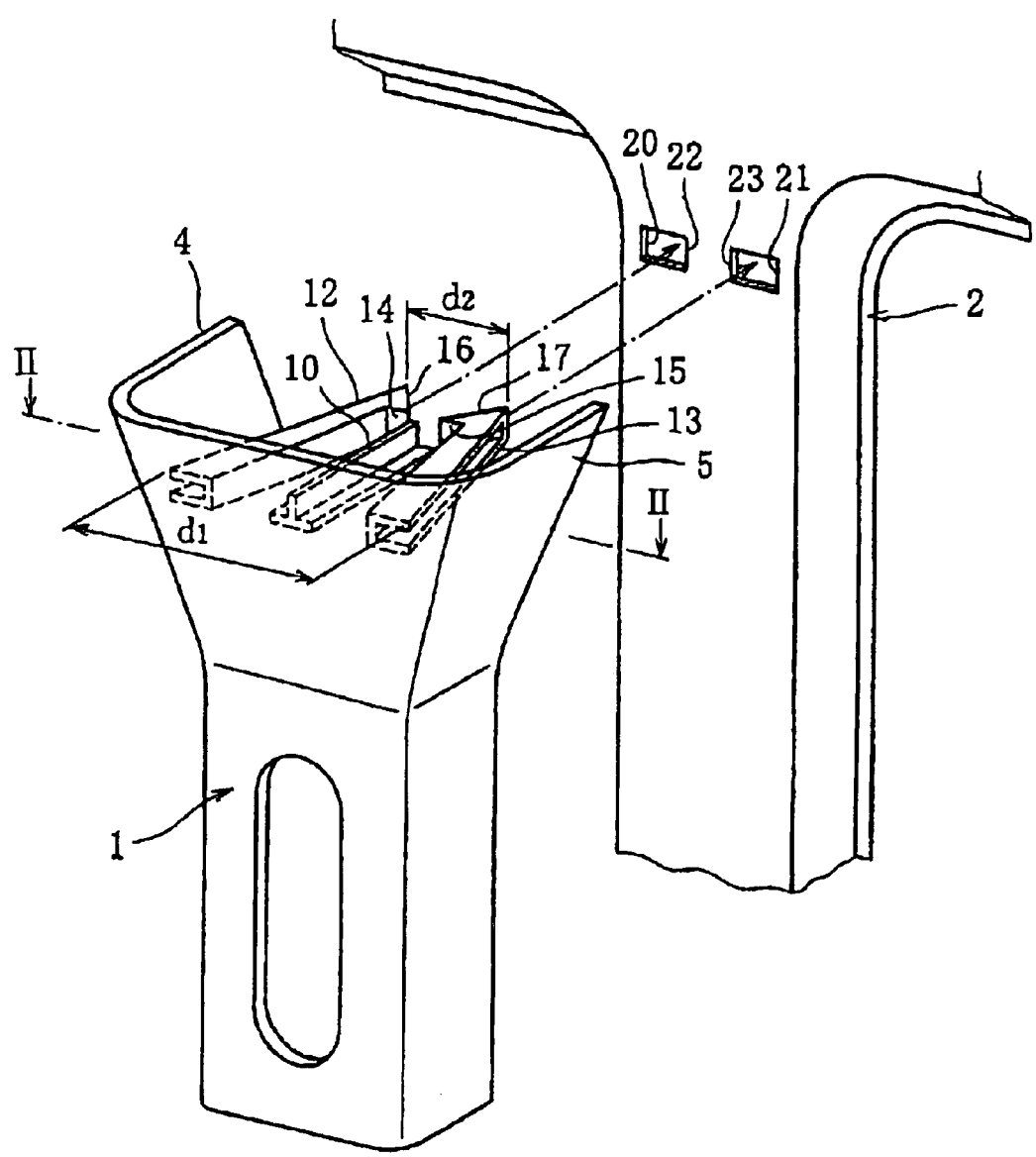
FIG. 1 is a perspective view showing a mode, in which a pillar trim according to a first embodiment of the present invention is mounted on a pillar.

With reference to FIG. 1, the mode, in which a pillar trim 1, having a pillar trim structure according to the present invention, is mounted on a pillar (e.g., a center pillar) 2, is shown in a perspective view.

The pillar trim 1 is molded of a synthetic resin, for example, to have a predetermined elasticity in its entirety.

On the face (or the back face) of the pillar trim 1 outside of the vehicular widthwise (lateral) direction, as shown in FIG. 1, an abutment member 10 is erected integrally with the pillar trim 1. Near this abutment member 10, moreover, such a pair of retained members 12 and 13 are also erected integrally with the pillar trim 1 as are opposed to each other across the abutment member 10.

The abutment member 10 is in abutment at its leading end against the pillar 2 when the pillar trim 1 is mounted on the pillar 2, and is constructed to have a flat face at its leading end. Here, the abutment member 10 is formed to have a T-shaped cross-section but may have any cross-sectional shape.

The retained members 12 and 13 are formed to have inverted identical shapes and are inserted at their leading ends into a pair of holes 20 and 21, when the pillar trim 1 is mounted on the pillar 2, so that they retain the peripheral edges 22 and 23 of the holes 20 and 21, respectively. The individual leading ends of the retained members 12 and 13 are formed to have retained pawls 14 and 15 protruding to confront each other. Specifically, the retained member 12 is fixed at its one end on the vehicular forward side of the vehicular longitudinal center portion of the pillar trim 1 and is so far extended obliquely backward of the vehicle to the side of the pillar 2 as is retained in the hole 20 formed in the pillar 2. The retained member 13 is fixed at its one end on the vehicular backward side of the vehicular longitudinal center portion of the pillar trim 1 and is so far extended obliquely forward of the vehicle to the side of the pillar 2 as is retained in the hole 21 formed in the pillar 2.

Moreover, the retained pawl 14 of the retained member 12 is extended backward of the vehicle from the other end of the retained member 12, and the retained pawl 15 of the retained member 13 is extended forward of the vehicle from the other end of the retained member 13. In the state where the pillar trim 1 is not mounted on the pillar 2, the retained pawls 14 and 15 are constructed to abut against the leading end of the abutment member 10. On the vehicular outer side of the retained pawl 14, moreover, there is formed a slope 16, which is inclined forward of the vehicle as it extends toward the outer side of the vehicle. On the vehicular outer side of the retained pawl 15, there is formed a slope 17, which is inclined backward of the vehicle as it extends toward the outer side of the vehicle. Here, the retained members 12 and 13 are formed to have a C-shaped cross-section. However, the retained members 12 and 13 should not be limited to that shape but may be solid members.

Moreover, the retained members 12 and 13 are so set that a root end distance d1 is larger than a leading end distance d2 (i.e., d1>d2). In other words, the individual root end portions of the retained members 12 and 13 are positioned on the relatively outer sides, as viewed widthwise of the pillar trim 1.

Here will be described the actions of the pillar trim structure thus constructed according to the present invention.

Figure 2:
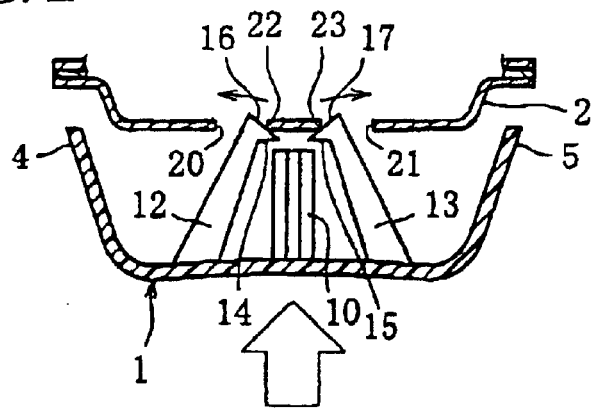
FIG. 2 is a diagram showing a state, in which the pillar trim according to the first embodiment of the present invention is in the course of being mounted on the pillar.
Figure 3:
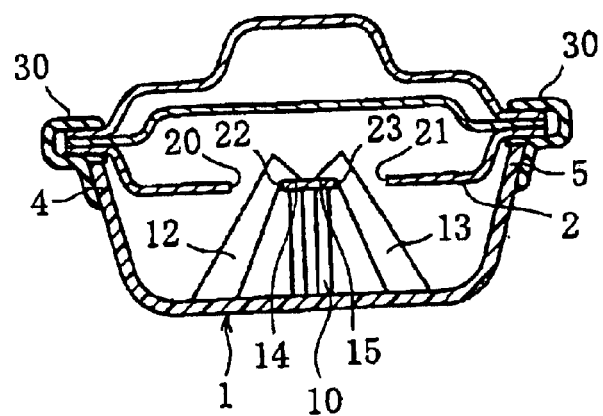
FIG. 3 is a diagram showing a state, in which the pillar trim according to the first embodiment of the present invention has been mounted on the pillar.
Figure 4:
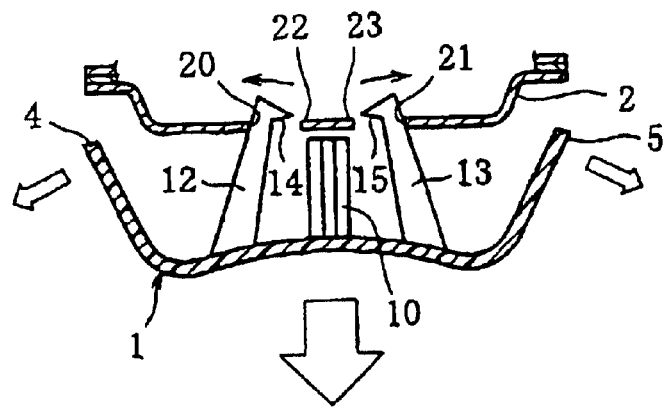
FIG. 4 is a diagram showing a state, in which the pillar trim according to the first embodiment of the present invention is in the course of being demounted from the pillar.

With reference to FIGS. 2 to 4 presenting cross-sections taken along line II—II of FIG. 1: FIG. 2 shows the state, in which the pillar trim 1 is in the course of being mounted on the pillar 2; FIG. 3 shows the state, in which the pillar trim 1 has been mounted on the pillar 2; and FIG. 4 shows the state, in which the pillar trim 1 is in the course of being demounted from the pillar 2. The following description will be made with reference to FIGS. 2 to 4.

First of all, the case of mounting the pillar trim 1 on the pillar 2 will be described with reference to FIGS. 2 and 3.

When the pillar trim 1 is to be mounted on the pillar 2, the positions of the retained members 12 and 13 are adjusted to the holes 20 and 21 of the pillar 2, and the pillar trim 1 is pushed, as indicated by a large blank arrow in FIG. 2.

Then, the slopes 16 and 17 of the retained members 12 and 13 come into abutment against the peripheral edges 22 and 23 on the inner sides of the holes 20 and 21. The distance between the slopes 16 and 17 is made to be narrower as they extend farther away from the side of the pillar 2. Therefore, the retained members 12 and 13 advance while being pushed out to the outer sides, as indicated by solid arrows, by the peripheral edges 22 and 23. Finally, the abutment member 10 abuts at its leading end against the pillar 2, and the retained pawls 14 and 15 are retained by the peripheral edges 22 and 23.

At this time, two widthwise ends 4 and 5 of the pillar trim 1 leave each other, as shown in FIG. 4, and the pillar trim 1 is deformed to warp in the widthwise direction so that the elastic energy is stored in the pillar trim 1. As a result, the retained pawls 14 and 15 are reliably retained on the peripheral edges 22 and 23 by the elastic force of the pillar trim 1 so that they clamp the peripheral edges 22 and 23 of the pillar 2 satisfactorily without any looseness in association with the abutment member 10.

As a result, the pillar trim 1 is easily and reliably fixed on the pillar 2, as shown in FIG. 3. Even if the vehicle vibrates or even if a curtain type airbag (although not shown) housed in the roof side portion over the pillar 2 is deployed, therefore, the pillar trim 1 is prevented from easily falling off.

Here in FIG. 3, the terminal of the pillar 2, i.e., the flange around the door opening is clamped by an opening trim member 30, and the two widthwise ends 4 and 5 of the pillar trim 1 are held on the side of the pillar 2. As a result, the two widthwise ends 4 and 5 are reliably prevented from easily leaving each other, and the retained pawls 14 and 15 are satisfactorily retained on the peripheral edges 22 and 23, so that the pillar trim 1 can be reliably prevented from falling off.

With reference to FIG. 4, here will be described the case, in which the pillar trim 1 is demounted from the pillar 2.

When the pillar trim 1 is demounted from the pillar 2, the opening trim member 30 is removed, and the two widthwise ends 4 and 5 are opened, as shown by small blank arrows in FIG. 4, so that they may leave each other. In short, the pillar trim 1 is deformed to warp in the widthwise direction against the elastic force.

Thus, the retained members 12 and 13 are widened outside, as individually indicated by solid arrows, so that their retentions by the peripheral edges 22 and 23 of the retained pawls 14 and 15 are easily released.

Here, the retained members 12 and 13 are so set that the root end distance d1 is larger than the leading end distance d2 (i.e., d1>d2), as shown in FIG. 1, and the individual root end portions of the retained members 12 and 13 are positioned on the relatively outer sides, as viewed widthwise of the pillar trim 1. When the two widthwise ends 4 and 5 are separated from each other, therefore, the retained members 12 and 13 can be relatively largely turned (or moved) on the center of the pillar trim 1. Therefore, the individual leading ends of the retained members 12 and 13 can be largely opened to release the retentions of the retained pawls 14 and 15 naturally and reliably.

With the retained pawls 14 and 15 being released from their retentions, moreover, the pillar trim 1 is removed from the pillar 2, as shown by a large blank arrow. As a result, the pillar trim 1 can be easily demounted.

Thus, in the pillar trim structure having the simple construction according to the present invention, the pillar trim 1 can be mounted and retained on the pillar 2 without the possibility of easily falling off and can be extremely easily demounted from the pillar 2, if desired so.

Figure 5:
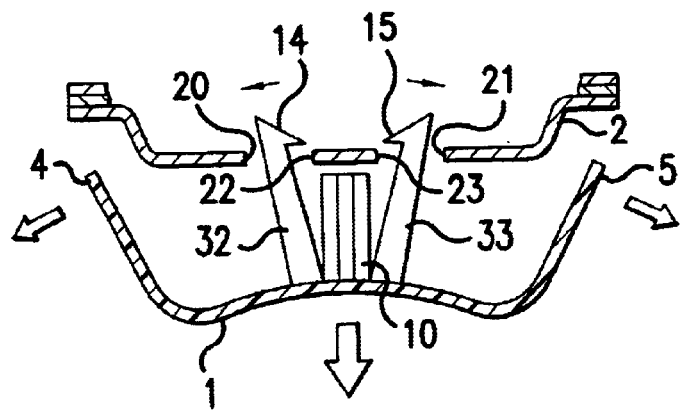
FIG. 5 is a diagram showing a state, in which a pillar trim according to a second embodiment of the present invention is in the course of being demounted from a pillar.

FIG. 5 shows a second embodiment of the pillar trim structure according to the present invention. As shown in FIG. 5, the second embodiment has a construction substantially similar to that of the foregoing first embodiment except for the shapes of retained members 32 and 33.

The retained member 32 is fixed at its one end on the vehicular widthwise outer face of the pillar trim 1, i.e., on the vehicular forward side of the vehicular center portion of the pillar trim 1, as viewed in the vehicular longitudinal direction, and is so far extended obliquely forward of the vehicle to the side of the pillar 2 as is retained in the hole 20 formed in the pillar 2. On the other hand, the retained member 33 is fixed at its one end on the vehicular widthwise outer face of the pillar trim 1, i.e., on the vehicular backward side of the vehicular center portion of the pillar trim 1, as viewed in the vehicular longitudinal direction, and is so far extended obliquely backward of the vehicle to the side of the pillar 2 as is retained in the hole 21 formed in the pillar 2.

In short, the retained members 32 and 33 are formed to have inverted identical shapes and to leave each other as they extend toward the outer side of the vehicle.

When demounting the pillar trim 1 from the pillar 2, moreover, the two widthwise ends 4 and 5 are opened, as shown by small blank arrows in FIG. 5, so that they may leave each other. In short, the pillar trim 1 is deformed to warp in the widthwise direction against the elastic force.

Thus, the retained members 12 and 13 are widened outside at their leading end portions, as individually indicated by solid arrows, so that their retentions by the peripheral edges 22 and 23 of the retained pawls 14 and 15 can be easily released to provide actions and effects similar to those of the foregoing first embodiment.

Figure 6:
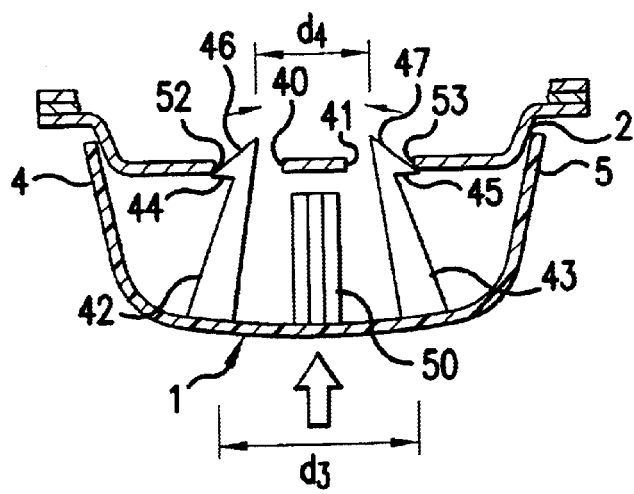
FIG. 6 is a diagram showing a state, in which a pillar trim according to a third embodiment of the present invention is in the course of being mounted on a pillar.
Figure 7:
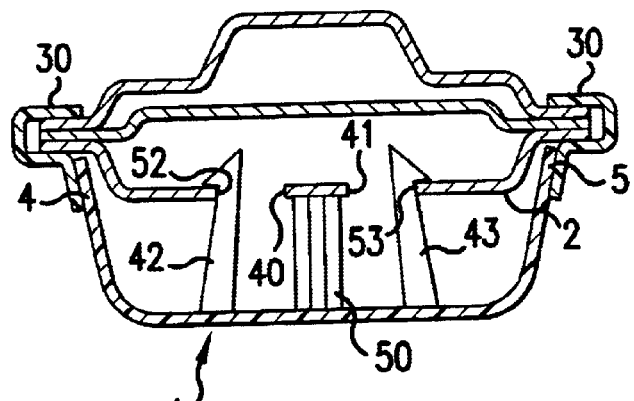
FIG. 7 is a diagram showing a state, in which the pillar trim according to the third embodiment of the present invention has been mounted on the pillar.
Figure 8:
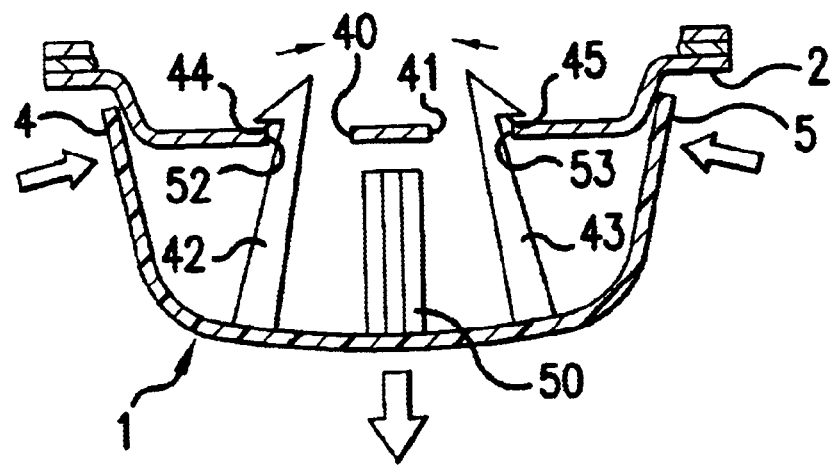
FIG. 8 is a diagram showing a state, in which the pillar trim according to the third embodiment of the present invention is in the course of being demounted from the pillar.

FIGS. 6 to 8 show a third embodiment of the pillar trim structure according to the present invention.

In the third embodiment, a retained member 42 is fixed at its one end on the vehicular widthwise outer face of the pillar trim 1, i.e., on the vehicular forward side of the vehicular center portion of the pillar trim 1, as viewed in the vehicular longitudinal direction, and is so far extended obliquely backward of the vehicle to the side of the pillar 2 that its other end is retained in a hole 40 formed in the pillar 2. The retained member 42 is provided at its leading end with a retained pawl 44 extended forward of the vehicle. On the vehicular outer side of the retained pawl 44, there is formed a slope 46, which is inclined backward of the vehicle as it extends toward the outer side of the vehicle.

On the other hand, a retained member 43 is fixed at its one end on the vehicular widthwise outer face of the pillar trim 1, i.e., on the vehicular backward side of the vehicular center portion of the pillar trim 1, as viewed in the vehicular longitudinal direction, and is so far extended obliquely forward of the vehicle to the side of the pillar 2 that its other end is retained in a hole 41 formed in the pillar 2. The retained member 43 is provided at its leading end with a retained pawl 45 extended backward of the vehicle. On the vehicular outer side of the retained pawl 45, there is formed a slope 47, which is inclined forward of the vehicle as it extends toward the outer side of the vehicle.

Here, the retained members 42 and 43 are formed to have a C-shaped cross-section. However, the retained members 42 and 43 should not be limited to that shape but may be solid members.

The actions of the pillar trim structure thus constructed according to the invention will be described.

With reference to FIGS. 6 to 8 showing cross-sections: FIG. 6 shows the state, in which the pillar trim 1 is in the course of being mounted on the pillar 2; FIG. 7 shows the state, in which the pillar trim 1 has been mounted on the pillar 2; and FIG. 8 shows the state, in which the pillar trim 1 is in the course of being demounted from the pillar 2. The following description will be made with reference to FIGS. 6 to 8.

First of all, the case of mounting the pillar trim 1 on the pillar 2 will be described with reference to FIGS. 6 and 7.

When the pillar trim 1 is to be mounted on the pillar 2, the positions of the retained members 42 and 43 are adjusted to the holes 40 and 41 of the pillar 2, and the pillar trim 1 is pushed, as indicated by a large blank arrow in FIG. 6.

Then, the slopes 46 and 47 of the retained members 42 and 43 come into abutment against the peripheral edges 52 and 53 on the outer sides of the holes 40 and 41. The distance between the slopes 46 and 47 is made the wider as they extend farther away from the side of the pillar 2. Therefore, the retained members 42 and 43 advance while being pushed in to the inner sides, as indicated by solid arrows, by the peripheral edges 52 and 53. Finally, an abutment member 50 abuts at its leading end against the pillar 2, and the retained pawls 44 and 45 are retained by the peripheral edges 52 and 53.

At this time, two widthwise ends 4 and 5 of the pillar trim 1 are deformed to approach each other, as shown in FIG. 7, so that the elastic energy is stored in the pillar trim 1. As a result, the retained pawls 44 and 45 are reliably retained on the peripheral edges 52 and 53 by the elastic force of the pillar trim 1 so that they clamp the peripheral edges 52 and 53 of the pillar 2 satisfactorily without any looseness in association with the abutment member 50.

As a result, the pillar trim 1 is fixed easily and reliably on the pillar 2, as shown in FIG. 7. Even if the vehicle vibrates or even if a curtain type airbag (although not shown) housed in the roof side portion over the pillar 2 is deployed, therefore, the pillar trim 1 is prevented from easily falling off.

With reference to FIG. 8, here will be described the case, in which the pillar trim 1 is demounted from the pillar 2.

When demounting the pillar trim 1 from the pillar 2, the opening trim member 30 is removed. Then, the two widthwise ends 4 and 5 are closed, as shown by small blank arrows in FIG. 8, so that they may be pushed to contract and approach each other. In short, the pillar trim 1 is deformed and pushed to contract in the widthwise direction against the elastic force.

Thus, the retained members 42 and 43 are narrowed to bring their leading end portions closer to each other, as individually indicated by solid arrows, so that their retentions by the peripheral edges 22 and 23 of the retained pawls 14 and 15 are easily released.

Here, the retained members 42 and 43 are so set that the root end distance d3 is larger than the leading end distance d4 (i.e., d3>d4), as shown in FIG. 6, and the individual root end portions of the retained members 42 and 43 are positioned on the relatively outer sides, as viewed widthwise of the pillar trim 1. When the two widthwise ends 4 and 5 are brought closer to each other, therefore, the retained members 42 and 43 can be relatively largely turned (or moved) on the center of the pillar trim 1. Therefore, the individual leading ends of the retained members 42 and 43 can be largely closed to release the retentions of the retained pawls 44 and 45 naturally and reliably.

Figure 9:
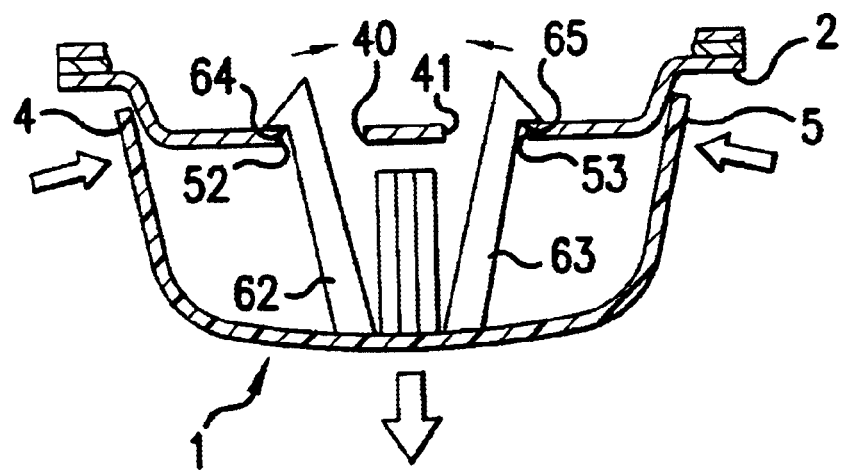
FIG. 9 is a diagram showing a state, in which a pillar trim according to a fourth embodiment of the present invention is in the course of being demounted from a pillar.

FIG. 9 shows a fourth embodiment of the pillar trim structure according to the present invention. As shown in FIG. 9, the fourth embodiment has a construction substantially similar to that of the foregoing third embodiment excepting the shapes of retained members 62 and 63.

The retained member 62 is fixed at its one end on the vehicular widthwise outer face of the pillar trim 1, i.e., on the vehicular forward side of the vehicular center portion of the pillar trim 1, as viewed in the vehicular longitudinal direction, and is so far extended obliquely forward of the vehicle to the side of the pillar 2 as is retained in the hole 40 formed in the pillar 2. On the other hand, the retained member 63 is fixed at its one end on the vehicular widthwise outer face of the pillar trim 1, i.e., on the vehicular backward side of the vehicular center portion of the pillar trim 1, as viewed in the vehicular longitudinal direction, and is so far extended obliquely backward of the vehicle to the side of the pillar 2 as is retained in the hole 41 formed in the pillar 2.

In short, the retained members 62 and 63 are formed to have inverted identical shapes and to leave each other as they extend toward the outer side of the vehicle.

When demounting the pillar trim 1 from the pillar 2, moreover, the two widthwise ends 4 and 5 are opened, as shown by small blank arrows in FIG. 9, so that they may approach each other. In short, the pillar trim 1 is deformed to contract in the widthwise direction against the elastic force.

Thus, the retained members 62 and 63 are brought closer to each other at their leading end portions, as individually indicated by solid arrows, so that their retentions by the peripheral edges 52 and 53 of the retained pawls 64 and 65 can be easily released to provide actions and effects similar to those of the foregoing first embodiment.

The description of the embodiments of the pillar trim structure according to the invention has been made, but the embodiments should not be limited to the foregoing ones.

For example, the foregoing embodiments have been described on the case, in which the abutment member and the retained members are disposed on the upper portion of the pillar trim 1. However, the positions for those abutment member and retained members should not be limited to the upper portion of the pillar trim 1 but may be additionally disposed on the lower portion or another portion of the pillar trim 1.

Here, the abutment member is constructed such that its one end is fixed on the pillar trim whereas its other end is held in abutment against the pillar with the retained members being retained on the pillar. However, the construction should not be limited to the aforementioned one but may be modified such that the abutment member is fixed on the pillar side whereas the other end is held in abutment against the pillar trim with the retained members being retained on the pillar.

In the foregoing embodiments, moreover, the paired retained members are inclined forward or backward of the vehicle as they extend from the pillar trim to the pillar. However, the construction should not be limited to the aforementioned one but may also be modified such that the paired retained members are not inclined from the pillar trim to the pillar but are individually extended generally at a right angle with respect to the vehicular longitudinal direction.

As has been described in detail hereinbefore, the pillar trim structure of the invention comprises: a first retained member having its one end fixed on the vehicular widthwise outer face of the pillar trim and extended to the side of the pillar and its other end retained in a first hole formed in the pillar; and a second retained member having its one end fixed on the vehicular widthwise outer face of the pillar trim and extended to the side of the pillar and its other end retained in a second hole formed in the pillar. The engagements between the first retained member and the second retained member, and the pillar can be released by deforming the pillar trim to separate the other end of the first retained member and the other end of the second retained member from each other.

Therefore, the pillar trim is stably fixed on the pillar side by the first retained member and the second retained member so that the pillar trim can be prevented from easily falling off. By deforming the pillar trim to separate the other end of the first retained member and the other end of the second retained member from each other, moreover, the retentions between the first retained member and the second retained member, and the pillar can be released to demount the pillar trim reliably and easily from the pillar, if desired so.

The invention thus being described, it will be obvious that the same may be varied in many ways. Such variations are not to be regarded as a departure from the spirit and scope of the invention, and all such modifications as would be obvious to one skilled in the art are intended to be included within the scope of the following claims:

What is claimed is:

1. A pillar trim structure, comprising:

a vehicular pillar;

a pillar trim for covering said pillar from an inner side of a compartment;

a first retained member having its one end fixed on a vehicular widthwise face of said pillar trim and extended to said pillar and its other end retained in a first hole formed in said pillar; and a second retained member having its one end fixed on the vehicular widthwise face of said pillar trim and extended to said pillar and its other end retained in a second hole formed in said pillar, wherein engagements between said first retained member and said second retained member, and said pillar can be released by deforming said pillar trim to separate the other end of said first retained member and the other end of said second retained member from each other.

2. A pillar trim structure according to claim 1, wherein one end of said first retained member is fixed on a vehicular forward side of a vehicular longitudinal center portion of said pillar trim, and wherein the one end of said second retained member is fixed on a vehicular backward side of the vehicular longitudinal center portion of said pillar trim.

3. A pillar trim structure according to claim 2, wherein said first retaining member is extended from its one end fixed on said pillar trim, obliquely in one of forward and backward directions of a vehicle to a side of the pillar as it is retained in the first retaining hole, wherein said second retaining member is extended from its one end fixed on said pillar trim, obliquely in the other direction of the vehicle to the side of the pillar as it is retained in the second retaining hole, and wherein said second retaining hole is disposed on the vehicular backward side of said first retaining hole.

4. A pillar trim structure according to claim 1, wherein said first retained member is provided at its other end with a first retained pawl, which is extended backward of a vehicle and retained by said pillar, and wherein said second retained member is provided at its other end with a second retained pawl, which is extended forward of the vehicle and retained by said pillar.

5. A pillar trim structure according to claim 4, wherein said first retained pawl is provided with a first slope, which is inclined forward of the vehicle as it extends toward an outer side of the vehicle.

6. A pillar trim structure according to claim 4, wherein said second retained pawl is provided with a second slope, which is inclined backward of the vehicle as it extends toward an outer side of the vehicle.

7. A pillar trim structure according to claim 1, wherein said pillar trim is provided with an abutment member, which has its one end fixed on the vehicular widthwise face of said pillar trim and its other end abutting against said pillar with said first retained member and said second retained member being retained on said pillar.

8. A pillar trim structure according to claim 1, wherein said pillar is provided with an abutment member, which has its one end fixed on a vehicular widthwise inner face of said pillar and its other end abutting against said pillar trim with said first retained member and said second retained member being retained on said pillar.

9. A pillar trim structure according to claim 4, wherein said pillar trim is provided, at its portion between the one end of said first retained member and the one end of said second retained member, with an abutment member, which has its one end fixed on the vehicular widthwise face of said pillar trim and its other end abutting against said pillar with said first retained member and said second retained member being retained on said pillar, and wherein said pillar is clamped between the retained pawl of said first retained member and the retained pawl of said second retained member, and the other end of said abutment member.

10. A pillar trim structure, comprising:

a vehicular pillar;

a pillar trim for covering said pillar from an inner side of a compartment;

a first retained member having its one end fixed on a vehicular widthwise face of said pillar trim and extended to said pillar and its other end retained in a first hole formed in said pillar; and a second retained member having its one end fixed on the vehicular widthwise outer face of said pillar trim and extended to said pillar and its other end retained in a second hole formed in said pillar, wherein engagements between said first retained member and said second retained member, and said pillar can be released by deforming said pillar trim to bring the other end of said first retained member and the other end of said second retained member closer to each other.

11. A pillar trim structure according to claim 10, wherein one end of said first retained member is fixed on a vehicular forward side of a vehicular longitudinal center portion of said pillar trim, and wherein the one end of said second retained member is fixed on a vehicular backward side of the vehicular longitudinal center portion of said pillar trim.

12. A pillar trim structure according to claim 11, wherein said first retaining member is extended from its one end fixed on said pillar trim, obliquely in one of forward and backward directions of a vehicle to a side of the pillar as it is retained in the first retaining hole, wherein said second retaining member is extended from its one end fixed on said pillar trim, obliquely in the other direction of the vehicle to the side of the pillar as it is retained in the second retaining hole, and wherein said second retaining hole is disposed on the vehicular backward side of said first retaining hole.

13. A pillar trim structure according to claim 10, wherein said first retained member is provided at its other end with a first retained pawl, which is extended forward of a vehicle and retained by said pillar, and wherein said second retained member is provided at its other end with a second retained pawl, which is extended backward of the vehicle and retained by said pillar.

14. A pillar trim structure according to claim 13, wherein said first retained pawl is provided with a first slope, which is inclined forward of the vehicle as it extends toward the outer side of the vehicle.

15. A pillar trim structure according to claim 13, wherein said second retained pawl is provided with a second slope, which is inclined backward of the vehicle as it extends toward an outer side of the vehicle.

16. A pillar trim structure according to claim 10, wherein said pillar trim is provided with an abutment member, which has its one end fixed on the vehicular widthwise face of said pillar trim and its other end abutting against said pillar with said first retained member and said second retained member being retained on said pillar.

17. A pillar trim structure according to claim 10, wherein said pillar is provided with an abutment member, which has its one end fixed on a vehicular widthwise inner face of said pillar and its other end abutting against the vehicular widthwise outer side of said pillar trim with said first retained member and said second retained member being retained on said pillar.

18. A pillar trim structure, comprising:

first and second retained members each having its one end fixed on a pillar trim and its other end retained in a corresponding hole formed in a pillar, such that said first and second retained members engage, respectively, with first and second holes formed in said pillar, wherein engagements between said first and second retained members and said pillar are released by deforming said pillar trim to change the angle of said first and second retained members with respect to said pillar.

19. A pillar trim, comprising:

a cover member for covering a vehicular pillar from an inner side of a vehicular compartment, the cover member being made of a flexible material;

a first retaining member extending from the cover member and having an end portion thereof provided with a first surface that engages with a first hole formed in the vehicular pillar when the cover member is not deformed;

a second retaining member extending from the cover member and having an end portion thereof provided with a second surface that engages with a second hole formed in the vehicular pillar when the cover member is not deformed, wherein the first surface and the second surface disengage from vehicular pillar by deforming the cover member.

20. A pillar trim according to claim 19, wherein the first surface and the second surface disengage from the vehicular pillar when the cover member is deformed such that the end portion of the first retaining member and the end portion of the second retaining member are separated further away from each other.

21. A pillar trim according to claim 19, wherein the first surface and the second surface disengage from the vehicular pillar when the cover member is deformed such that the end portion of the first retaining member and the end portion of the second retaining member become closer together.

* * * * *